United States Patent [19]

Sayede

[11] Patent Number: 5,734,516
[45] Date of Patent: Mar. 31, 1998

[54] DEVICE FOR ACCURATELY POSITIONING THE VERTEX OF THE SECONDARY MIRROR OFF-CENTERED WITH RESPECT TO THAT OF THE PRIMARY MIRROR OF A TELESCOPE, AND TELESCOPE EQUIPPED WITH SUCH A DEVICE

[75] Inventor: Frédéric Noël Sayede, Cannes-La-Bocca, France

[73] Assignee: Societe Nationale Industrielle et Aerospatiale, Paris, France

[21] Appl. No.: 648,959

[22] Filed: May 16, 1996

[30] Foreign Application Priority Data

May 31, 1995 [FR] France ................... 95 06468

[51] Int. Cl.⁶ .................. G02B 7/182; G02B 23/00
[52] U.S. Cl. .................. 359/871; 359/364; 359/399; 359/430
[58] Field of Search .................. 359/364–366, 359/223–226, 399, 405, 429–430, 808, 811, 819–820, 824, 846–860

[56] References Cited

U.S. PATENT DOCUMENTS

| | | | |
|---|---|---|---|
| 4,123,136 | 10/1978 | Dahab et al. | 359/230 |
| 4,134,638 | 1/1979 | Drauglis | 359/364 |
| 4,629,297 | 12/1986 | Horine | 359/871 |
| 4,883,348 | 11/1989 | Spivey et al. | 359/364 |
| 5,162,951 | 11/1992 | Sorce | 359/224 |
| 5,414,564 | 5/1995 | Pausch et al. | 359/846 |

FOREIGN PATENT DOCUMENTS

| | | | |
|---|---|---|---|
| 2676549 | 11/1992 | France | 359/399 |
| 3934546 | 4/1991 | Germany . | |
| 2040067 | 8/1980 | United Kingdom | 359/366 |

OTHER PUBLICATIONS

"Design of a Servo–Mechanism to Control . . . "; A. Labeque et al.; Nov. 1975; pp. 419–437.
"Nutating Subreflector for a Millimeter . . . "; Radford; Mar., 1990; pp. 953–959.

*Primary Examiner*—Thong Nguyen
*Attorney, Agent, or Firm*—Fisher, Christen & Sabol

[57] ABSTRACT

A device for accurately positioning the vertex of a secondary mirror (5) off-centered with respect to that of a primary mirror (3) of a telescope (1). The secondary mirror (5) is connected to a support (8). The connection (9) includes two radial and crossed elongate connecting members (10) which extend on either side of the support (8) (along a first direction X—X and a second direction Y—Y) passing through the center (0) of the support, corresponding to the vertex (5A) of the secondary mirror (5). Each of the connecting members (10) is longitudinally rigid and transversely flexible. Each of the connecting members is capable of being controlled, in order to move along its longitudinal extent by an actuation device (11).

6 Claims, 2 Drawing Sheets

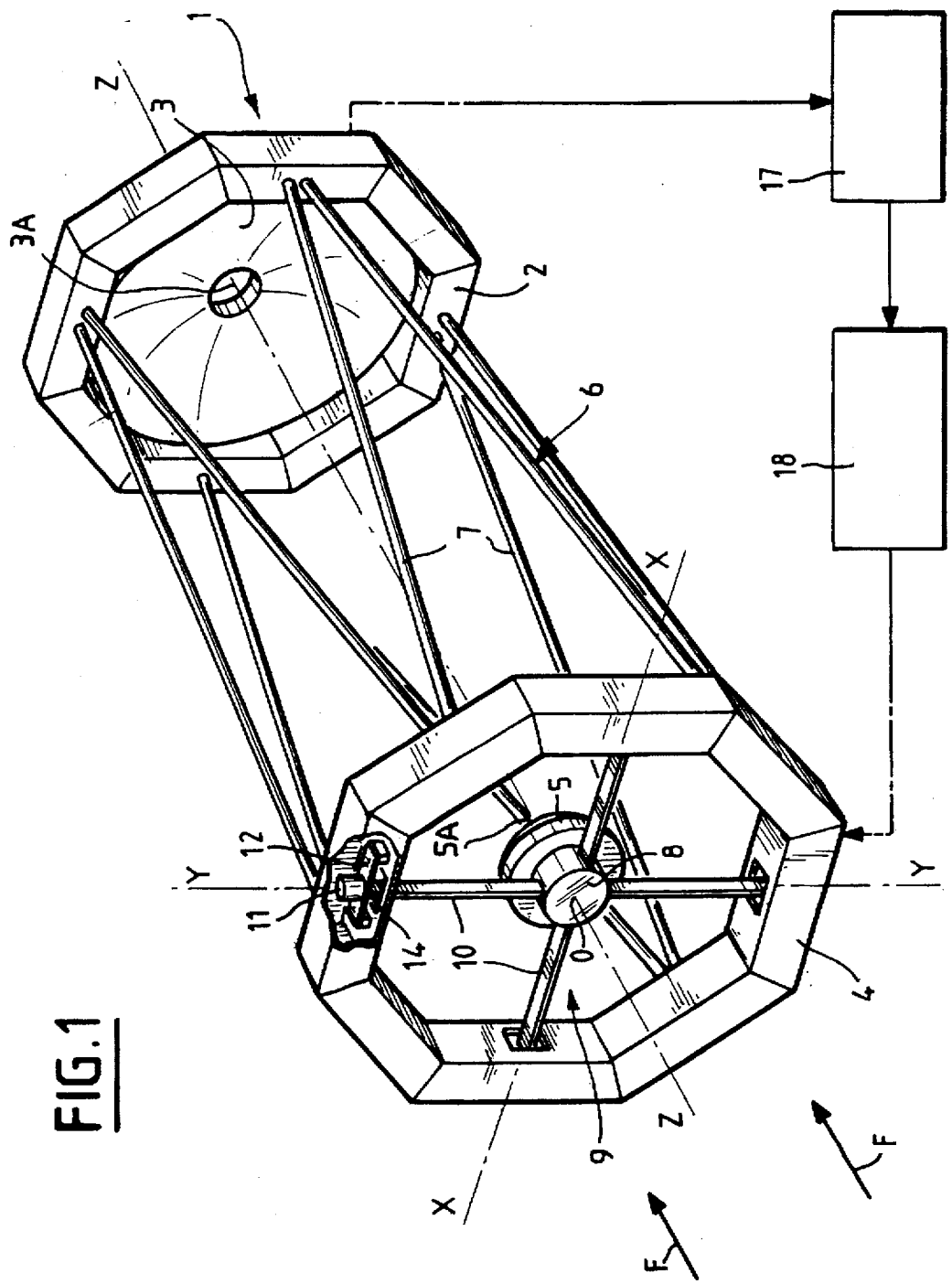

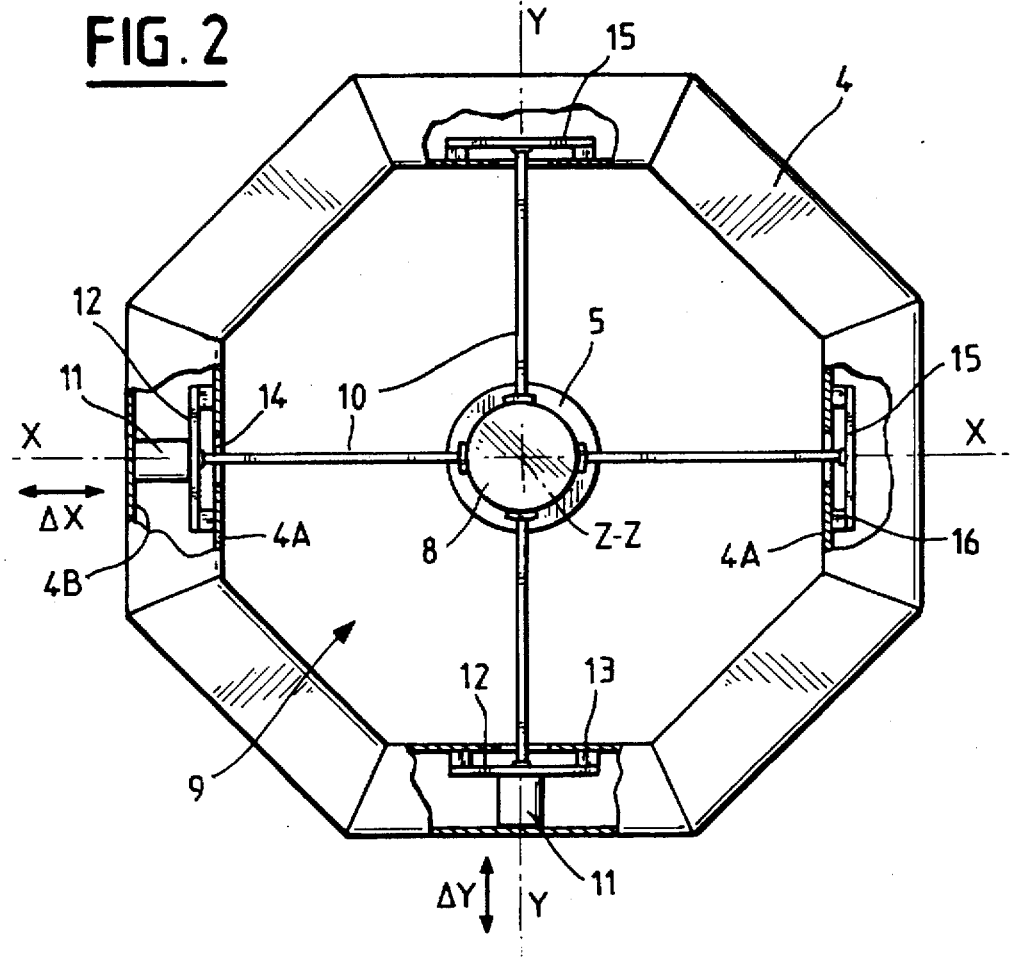
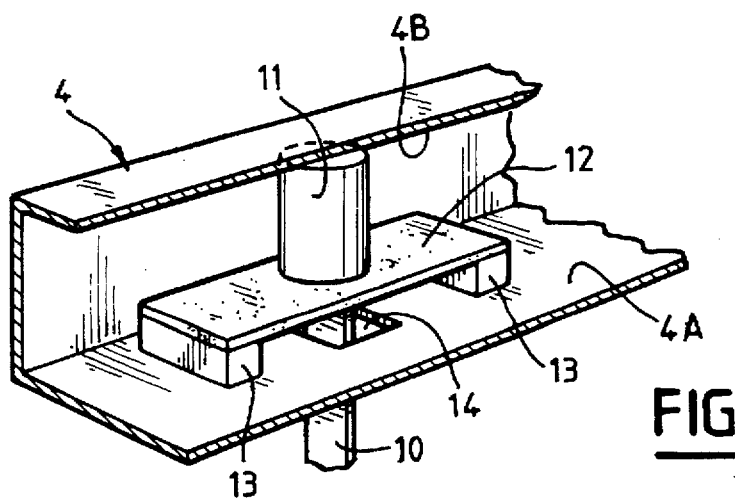

DEVICE FOR ACCURATELY POSITIONING THE VERTEX OF THE SECONDARY MIRROR OFF-CENTERED WITH RESPECT TO THAT OF THE PRIMARY MIRROR OF A TELESCOPE, AND TELESCOPE EQUIPPED WITH SUCH A DEVICE

BACKGROUND OF THE INVENTION

1. Field of the Invention

The present invention relates to a device for accurately positioning the vertex of the secondary mirror off-centered with respect to that of the primary mirror of a telescope, and to a telescope equipped with such a device.

2. Description of Related Art

It is known that one of the problems which occur with telescopes, in particular telescopes intended to operate in space, is that of obtaining and/or retaining in service the alignment of the optical axes of the primary and secondary mirrors, in other words, that of keeping the optical elements in position, in spite of the various external effects to which telescopes, in particular space telescopes, may be subjected. This function is difficult to fulfil using a passive structure.

SUMMARY OF THE INVENTION

The object of the present invention is to avoid this drawback, and the invention relates to a device permitting active correction of a possible off-centering depositioning between the vertices of the primary and secondary mirrors of a telescope.

To this end, the device for accurately positioning the vertex of the secondary mirror off-centered with respect to that of the primary mirror of a telescope, said secondary mirror being mounted on a support connected to an annular frame, which is at least substantially concentric with said support, by connecting means, is noteworthy, according to the invention, in that said connecting means comprise first and second radial and crossed elongate connecting members extending on either side of said support along a first direction X—X and a second direction Y—Y passing through the center of said support, corresponding to the vertex of said secondary mirror, said first and second connecting members being longitudinally rigid and transversely flexible and each being capable of being controlled, in order to move along their longitudinal extent, by respective actuation means.

In this way, any off-centering depositioning of the optical vertices of the primary and secondary mirrors can be compensated for by displacing the secondary mirror support in the plane defined by the X—X and Y—Y axes, by using the capacity of said connecting members for flexing, this being without said actuation means having to develop significant forces. Such a device is, thus, accurate and undemanding.

Advantageously, each of said connecting members consists of a pair of slats extending in extension of one another, said first and second pairs of slats being arranged orthogonally with respect to one another and perpendicularly to the plane defined by said first X—X and second Y—Y directions.

Preferably, each of said slats is fixed, on the one hand, to said support and, on the other hand, to a flexible plate arranged perpendicularly to said slat and fixed to the frame of the secondary mirror.

In the latter case, said actuation means comprise, for each of said pairs of slats, an actuator intended to act on said pair of slats via the flexible plate on which it bears.

Each of said plates may, furthermore, be secured to the inner internal face of the frame of the secondary mirror via support bars.

Advantageously, in this case, each actuator is a piezoelectric actuator fixed to the outer internal face of the frame of the secondary mirror and secured to the corresponding plate.

Although the actuation means may, of course, be controlled directly, according to another characteristic of the invention, it may be envisaged for the device to comprise at least one sensor intended to measure the off-centering depositioning of the vertices of said primary and secondary mirrors, which is connected to means for controlling said actuation means.

BRIEF DESCRIPTION OF THE DRAWINGS

The figures of the appended drawing will clearly show how the invention may be embodied.

FIG. 1 is a schematic perspective view of a telescope equipped with the device according to the invention.

FIG. 2 is a section, transverse to the longitudinal axis of the telescope, of the frame of the secondary mirror.

FIG. 3 is a detailed perspective view illustrating the arrangement of an actuator according to the invention.

DETAILED OF THE INVENTION

The space telescope 1 shown in FIG. 1 includes, in the conventional way, a first frame 2 (at the rear, considering the propagation direction of the light received, indicated by the arrows F) supporting the (concave) primary mirror 3, of vertex 3A, and a second (front) frame 4 supporting the (convex) secondary mirror 5, of vertex 5A. The first and second frames 2 and 4 have an annular shape, for example of octagonal cross section, as represented, and are connected together by a lattice 6 consisting of a certain number of connecting bars 7.

In addition, the secondary mirror 5 is mounted on a support 8 connected to the frame 4 by a structure 9 (referred to as a "spider") with four branches 10, which each consist of a longitudinally rigid and transversely flexible slat, said branches 10 extending in pairs along a first direction X—X and a second direction Y—Y, these directions being radial and crossed, preferably at a right angle, and defining a plane (the plane of the drawing in FIG. 2) which is orthogonal to the longitudinal axis Z—Z of the telescope, and passes through the vertices of the primary 3 and the secondary 5 mirrors, said first and second directions passing through the center 0 of the support 8 which corresponds to the vertex 5A of the secondary mirror 5. In addition, as shown, the slats 10 are perpendicular to the plane defined by the X—X and Y—Y axes, that is to say that their width extends parallel either to the plane defined by the X—X and Z—Z axes or to the plane defined by the Y—Y and Z—Z axes, and they are each secured to the support 8.

In addition, in order to control the displacement of each pair of slats 10 along their longitudinal extent, an actuator 11, in particular a piezoelectric actuator, is provided for each pair of slats 10 and is housed inside the frame 4, is fixed to the outer internal face 4B thereof and is intended to act on a plate 12 arranged perpendicularly to the slat 10, to which it is secured, and connected to the corresponding inner internal face 4A of the frame 4 via support bars 13, an opening 14 being provided for the passage of the corresponding slat 10. The other slat of each pair is also secured to a flexible plate 15, arranged perpendicularly thereto and fixed to the corresponding inner internal face 4A by support bars 16 (FIG. 2).

It can thus be seen that, for a small displacement $\Delta X$ or $\Delta Y$ of the order of, for example, a few hundred micrometers, which is controlled by the respective actuator 11, the flexible plates 15 perpendicular to the displacement, will flex, as will the perpendicular slats 10 of the "spider", allowing repositioning of the vertex of the secondary mirror in the X—X, Y—Y plane. By virtue of the introduction of flexibility into the actuation directions, the actuators 11 will not need to develop significant forces in order to displace the structural elements.

In such a system, the guidance is without play and does not require elements involving rolling bearings or friction. In order to avoid any buckling of the slats, the actuators will need to act by pulling on the slats, rather than by pushing them, over the entire range of travel for recentering. Thus, these actuators will advantageously be prestressed by flexing the plates over the entire range of travel of the actuator. It is, of course, possible for repositioning in one direction to require correction in the other direction (induced error).

In order to position or reposition the vertex of the secondary mirror on the vertex of the primary mirror, it is possible to control the actuators directly, in particular from the ground for the preliminary adjustments, or to use a control loop, as symbolically shown in FIG. 1, including one (or more) depositioning sensor(s) 17 connected to a control system 18 for the actuators 11.

I claim:

1. An active secondary mirror mount for a telescope, said mount comprising:
   (a) a support (8) having a center (0) and supporting said secondary mirror (5) in such a way that the vertex of said secondary mirror (5) and said center (0) of said support (8) are centered on the longitudinal axis (Z—Z) of said telescope;
   (b) an annular frame (4) at least substantially concentric with said support;
   (c) means (9) for connecting said support (8) to said annular frame (4), said connecting means (9) consisting of a first pair and a second pair of radial crossed slats (10) longitudinally rigid and transversely flexible, said first pair of slats extending along a first direction (X—X) and said second pair of slats extending along a second direction (Y—Y), said first and second directions being perpendicular with respect to one another and passing through said center (0) of said support (8), said slats (10) being arranged perpendicularly to the plane defined by said first and second directions and being fixed, on the one hand, to said support (8) and, on the other hand, to a flexible plate (12, 15) arranged perpendicularly to said slat (10) and fixed to the frame (4) of the secondary mirror (5); and
   (d) actuation means (11) for moving said slats (10) along their longitudinal extent.

2. The device as claimed in claim 1, wherein said actuation means comprise, for each of said pairs of slats (10, 10), an actuator (11) intended to act on said pair of slats (10, 10) via the flexible plate (12) on which it bears.

3. The device as claimed in claim 1, wherein each of said plates (12, 15) is secured to the inner internal face (4A) of the frame (4) of the secondary mirror (5) via support bars (13, 16).

4. The device as claimed in claim 3, wherein each actuator (11) is a piezoelectric actuator fixed to the outer internal face (4B) of the frame (4) of the secondary mirror (5) and secured to the corresponding plate (12).

5. The device as claimed in claim 1, which comprises at least one sensor (17) intended to measure the off-centering depositioning of the vertices of said primary (3) and secondary (5) mirrors, which is connected to means (18) for controlling said actuation means (11).

6. A telescope, which is equipped with a device as claimed in claim 1.

* * * * *

UNITED STATES PATENT AND TRADEMARK OFFICE
CERTIFICATE OF CORRECTION

PATENT NO. : 5,734,516
DATED : March 31, 1998
INVENTOR(S) : Frederic Noel SAYEDE It is certified that error appears in the above-indentified patent and that said Letters Patent is hereby corrected as shown below:

On the title page item [73],
    should read -- Aerospatiale Societe Nationale
                    Industrielle --.

Signed and Sealed this

Tenth Day of November 1998

Attest:

BRUCE LEHMAN

*Attesting Officer*     *Commissioner of Patents and Trademarks*